(12) United States Patent
Shelke et al.

(10) Patent No.: US 11,893,985 B2
(45) Date of Patent: Feb. 6, 2024

(54) SYSTEMS AND METHODS FOR VOICE EXCHANGE BEACON DEVICES

(71) Applicant: Harman International Industries, Incorporated, Stamford, CT (US)

(72) Inventors: Sagar Shelke, Dallas, TX (US); Srinath Arunachalam, Dallas, TX (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 386 days.

(21) Appl. No.: 17/150,935

(22) Filed: Jan. 15, 2021

(65) Prior Publication Data

US 2022/0230634 A1   Jul. 21, 2022

(51) Int. Cl.
| | | |
|---|---|---|
| G10L 15/22 | (2006.01) | |
| G10L 17/06 | (2013.01) | |
| G10L 15/00 | (2013.01) | |
| G10L 15/30 | (2013.01) | |

(52) U.S. Cl.
CPC ............ *G10L 15/22* (2013.01); *G10L 15/005* (2013.01); *G10L 15/30* (2013.01); *G10L 17/06* (2013.01)

(58) Field of Classification Search
CPC ....... G10L 15/22; G10L 15/005; G10L 15/30; G10L 17/06; G10L 15/00; G10L 17/00; G06F 3/167
USPC .......................................................... 704/270
See application file for complete search history.

(56) References Cited

U.S. PATENT DOCUMENTS

| | | | |
|---|---|---|---|
| 9,172,747 B2 | 10/2015 | Walters et al. | |
| 10,055,681 B2* | 8/2018 | Brown | G06N 3/008 |
| 10,069,976 B1 | 9/2018 | Gunther | |
| 10,482,885 B1* | 11/2019 | Moniz | G06F 3/167 |
| 10,706,846 B1* | 7/2020 | Barton | G10L 15/063 |
| 10,762,904 B2* | 9/2020 | Toma | G10L 17/00 |
| 11,188,808 B2* | 11/2021 | Wang | G06F 3/167 |
| 11,410,646 B1* | 8/2022 | Erbas | G10L 15/1822 |
| 11,715,109 B2* | 8/2023 | Pi Farias | G06Q 20/409 |
| | | | 705/16 |
| 2005/0152557 A1* | 7/2005 | Sasaki | H04S 7/302 |
| | | | 381/59 |
| 2008/0312925 A1* | 12/2008 | Jaiswal | H04Q 3/64 |
| | | | 704/E15.001 |
| 2011/0307362 A1* | 12/2011 | Lara | G06Q 50/01 |
| | | | 705/30 |

(Continued)

*Primary Examiner* — Thuykhanh Le
(74) *Attorney, Agent, or Firm* — McCoy Russell LLP

(57) ABSTRACT

Methods and systems are provided for extending ranges of a plurality of voice assistant systems and interacting with the plurality of voice assistant systems using a common beacon network system. In one example, the beacon network system includes at least one primary beacon device communicatively coupled to and/or within corresponding listening ranges of one or more voice assistant systems, and a plurality of secondary beacon devices communicatively coupled to the primary beacon device and distributed within an operating environment. The beacon network system enables multi-user interaction with the plurality of voice assistant systems. Further, the beacon network system is scalable and may be deployed in a wide range of operating environments (e.g., operating environments of various sizes).

12 Claims, 11 Drawing Sheets

(56) References Cited

U.S. PATENT DOCUMENTS

| | | | |
|---|---|---|---|
| 2015/0117674 A1* | 4/2015 | Meachum | H04L 65/4038 381/94.1 |
| 2015/0172262 A1* | 6/2015 | Ortiz, Jr. | H04W 12/068 715/706 |
| 2016/0040902 A1* | 2/2016 | Shah | F24F 11/52 700/277 |
| 2016/0111109 A1* | 4/2016 | Tsujikawa | H04R 3/005 704/226 |
| 2016/0155443 A1* | 6/2016 | Khan | G06F 3/167 704/275 |
| 2017/0093356 A1* | 3/2017 | Cudak | H03G 3/32 |
| 2017/0269975 A1* | 9/2017 | Wood | G10L 15/1815 |
| 2017/0330566 A1* | 11/2017 | Trott | G10L 15/32 |
| 2017/0330571 A1* | 11/2017 | Komaki | H04R 5/04 |
| 2018/0233142 A1* | 8/2018 | Koishida | H04N 7/181 |
| 2018/0293484 A1* | 10/2018 | Wang | G06F 16/632 |
| 2018/0359364 A1* | 12/2018 | Gunther | H04M 3/5237 |
| 2019/0013019 A1* | 1/2019 | Lawrence | G10L 15/30 |
| 2019/0042647 A1* | 2/2019 | Oh | G06F 16/639 |
| 2019/0155664 A1* | 5/2019 | Wood | G10L 15/1815 |
| 2019/0172015 A1* | 6/2019 | Hamby | B60K 35/00 |
| 2019/0304443 A1* | 10/2019 | Bhagwan | G06F 3/167 |
| 2019/0311710 A1* | 10/2019 | Eraslan | H04L 67/568 |
| 2019/0311719 A1* | 10/2019 | Adams | G10L 15/30 |
| 2019/0371324 A1* | 12/2019 | Powell | G10L 15/22 |
| 2020/0068400 A1* | 2/2020 | Ramic | H04L 63/102 |
| 2020/0090646 A1* | 3/2020 | Smith | G10L 15/08 |
| 2020/0126547 A1* | 4/2020 | Truong | G10L 15/22 |
| 2020/0137490 A1* | 4/2020 | Fu | H04R 3/005 |
| 2020/0143814 A1* | 5/2020 | Moniz | G10L 17/06 |
| 2020/0201495 A1* | 6/2020 | Coffman | G06F 3/167 |
| 2020/0218927 A1 | 7/2020 | Arunachalam | |
| 2020/0342084 A1* | 10/2020 | Zhao | H04L 9/40 |
| 2020/0348765 A1* | 11/2020 | Gurovich | G06F 1/1698 |
| 2020/0404610 A1* | 12/2020 | Crouch | G01S 5/0036 |
| 2021/0157536 A1* | 5/2021 | Sugawara | G06F 3/1253 |
| 2021/0158800 A1* | 5/2021 | Kim | G06F 3/0484 |
| 2021/0210086 A1* | 7/2021 | Han | G10L 15/22 |
| 2021/0210099 A1* | 7/2021 | Wander | G10L 15/32 |
| 2021/0241759 A1* | 8/2021 | Yang | G10L 15/08 |
| 2021/0343279 A1* | 11/2021 | Aher | G10L 25/60 |
| 2021/0345985 A1* | 11/2021 | Cunningham | A61B 7/04 |
| 2021/0398543 A1* | 12/2021 | Tan | G06Q 50/26 |
| 2022/0155737 A1* | 5/2022 | Gartenberg | G05B 19/042 |
| 2022/0279063 A1* | 9/2022 | Coffman | G06F 3/0482 |
| 2022/0292331 A1* | 9/2022 | Zimmermann | G06N 3/045 |
| 2022/0358919 A1* | 11/2022 | Xu | G10L 15/24 |
| 2023/0017274 A1* | 1/2023 | Li | G10L 21/10 |

* cited by examiner

SYSTEMS AND METHODS FOR VOICE EXCHANGE BEACON DEVICES

FIELD

The disclosure relates to voice assistant devices.

BACKGROUND

Voice Assistant devices or voice assistant-enabled devices or smart speakers that perform tasks according to voice commands or respond to verbal questions are increasing in popularity. Some non-limiting examples of voice assistant devices include Google at home, Amazon Echo, etc.

Some voice assistants may be better at a particular task than the others. As a non-limiting example, Google voice assistant may have superior internet search capabilities, whereas Amazon Echo may have better compatibility with other smart devices (e.g., thermostat) while also facilitating online shopping on Amazon.

SUMMARY

In order to enable a range of functions, more than one type of voice assistant device may be utilized in an environment (e.g., home, business, or other premises). However, a listening range of a given voice assistant (e.g., an area in which voice data may be detected by the voice assistant device) may not be large enough to cover an entire house, building, or other environment, especially when taking into account obstacles, such as walls separating rooms, that further reduce an effective range of the device. Thus, the users may have to buy multiple devices of each virtual assistant, if they want to use it across the operating environment.

Further, in an environment with more than one voice assistant, a common interface to interact with the different voice assistants is needed in order to facilitate the users to use different voice assistants with a wide listening range.

The present disclosure provides systems and methods for a common interface network to communicate with different voice assistants. For example, a primary-secondary beacon network may be employed to extend a range of the different voice assistants in an operating environment while also enabling a common interface for the user to interact with the different voice assistants. The primary-secondary beacon network described herein is scalable for deployment in a wide range of operating environment sizes (e.g., home, business, hotel, airport, cruise ships, etc.), and may be utilized with various types of voice assistant devices, including generic voice assistant devices (e.g., Google home, Amazon Echo, etc), application specific voice assistants (e.g., ZOE in cruise ships, hotel-specific voice assistants, etc), location-based query server (e.g., airport information servers), etc.

Embodiments are disclosed for a beacon network including at least one primary beacon device communicatively coupled to one or more secondary beacon devices. An example method includes acquiring, via a secondary beacon device of a plurality of secondary beacon devices, audio data corresponding to a voice input from a user, the voice input including a voice query to a voice assistant; transmitting the audio data from the secondary beacon device to a primary beacon device; processing the audio data at the primary beacon device, and transmitting the processed audio data from the primary beacon device to the voice assistant; receiving, at the primary beacon device, a voice response to the voice query from the voice assistant; transmitting the voice response from the primary beacon device to the secondary beacon device; and rendering the voice response at the first secondary beacon device.

An example beacon device comprises an audio sensor; a speaker; a network interface; a processor; and a memory device storing instructions executable by the processor to: receive, via the audio sensor or the network interface, first audio data corresponding to a voice input, the voice input including a voice query to a voice assistant; transmit, via the network interface, the first audio data to one other beacon device or to the voice assistant; and receive a voice response to the voice query from a voice assistant or via the one another beacon device.

An example beacon network comprises a primary beacon device including a speaker, a microphone, a processor and a memory; and one or more secondary beacon devices communicatively coupled to the primary beacon device; each of the one or more beacon devices including a secondary beacon speaker, a secondary beacon microphone, a secondary beacon processor and a secondary beacon memory; wherein the memory of the primary beacon stores instructions executable by the processor to: receive, audio data from each of the one or more secondary beacon devices, each audio data including a voice query to a requested voice assistant; transmit each voice query to the requested voice assistant according to a priority assigned to each voice query; receive a voice response to each voice query from the requested voice assistant; and transmit the voice response to a corresponding secondary beacon device from which each voice query originated; wherein the requested voice assistant is any of one or more voice assistants communicatively coupled to the primary beacon device and wherein the primary beacon device is within a corresponding listening range of the one or more voice assistants.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1B:
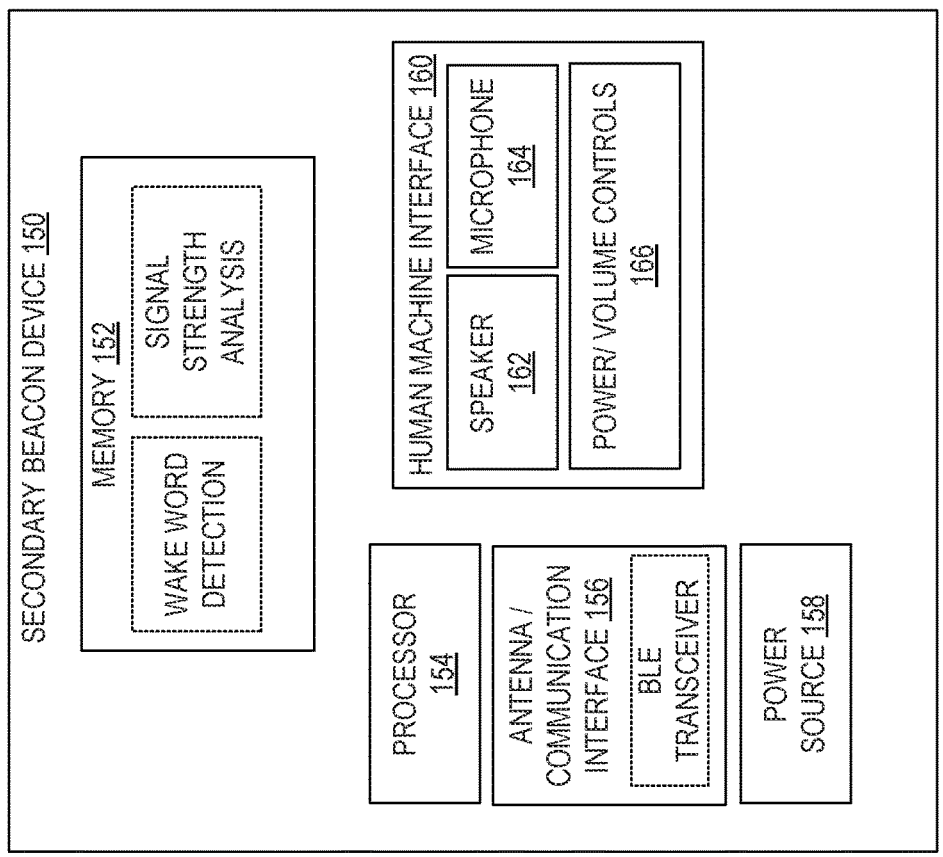
FIG. 1B shows a block diagram of a secondary beacon device of a beacon network in accordance with one or more embodiments of the present disclosure.
Figure 1A:
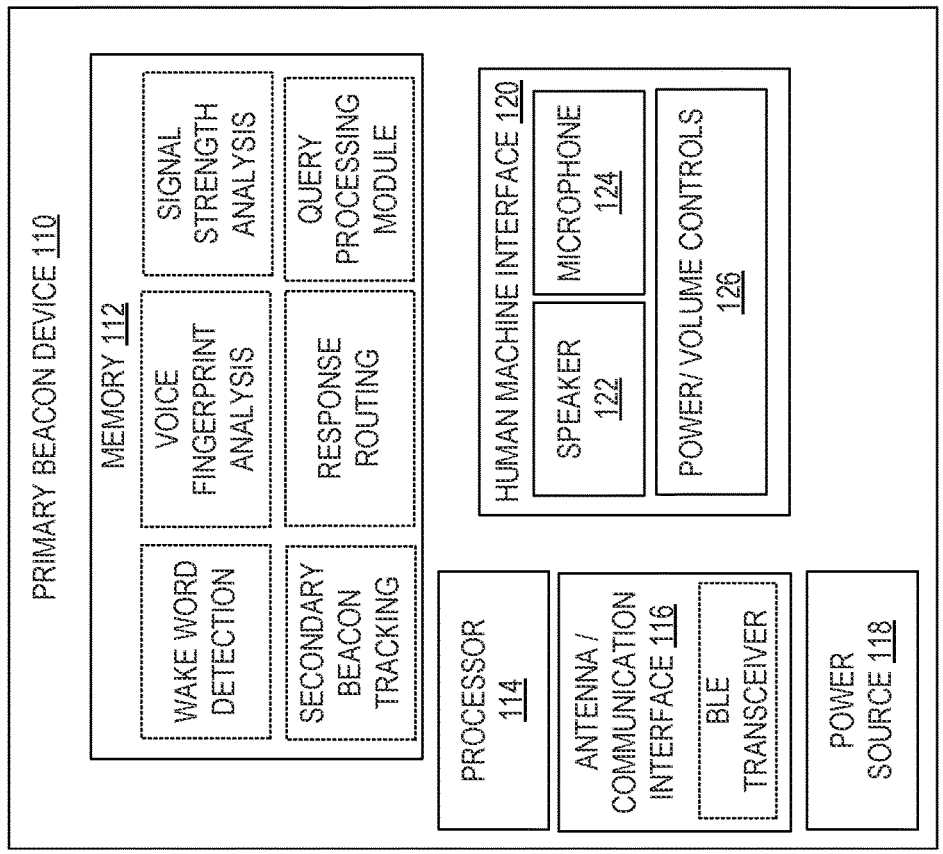
FIG. 1A shows a block diagram of a primary beacon device of a beacon network in accordance with one or more embodiments of the present disclosure.

A beacon network may include a primary beacon device that may be communicatively coupled to one or more voice assistants and/or may be located within a listening range of the one or more voice assistants. The primary beacon device may also be wirelessly coupled to one or more secondary beacon devices that are positioned with respect to the primary beacon device and across various areas of an operating environment in which the beacon network is deployed. An example primary beacon device is shown at FIG. 1A and an example secondary beacon device is shown at FIG. 1B. The primary-secondary relationship may include asymmetric communication or control where one device or process (the "primary") controls one or more other devices or processes (the "secondary") and serves as a more-centralized communication hub.

Figure 2A:
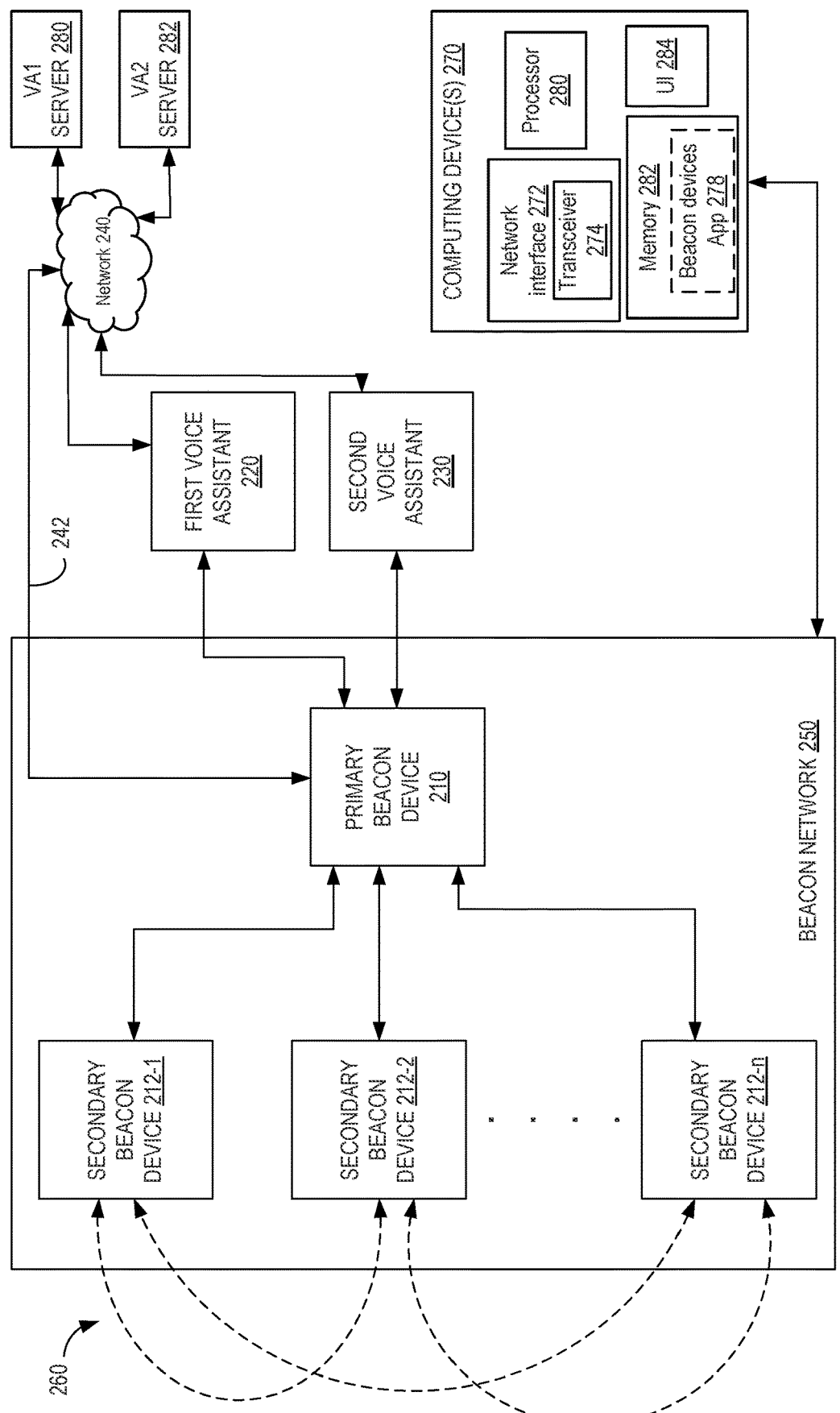
FIGS. 2A and 2B show example network topologies of a beacon network in accordance with one or more embodiments of the present disclosure.
Figure 2B:
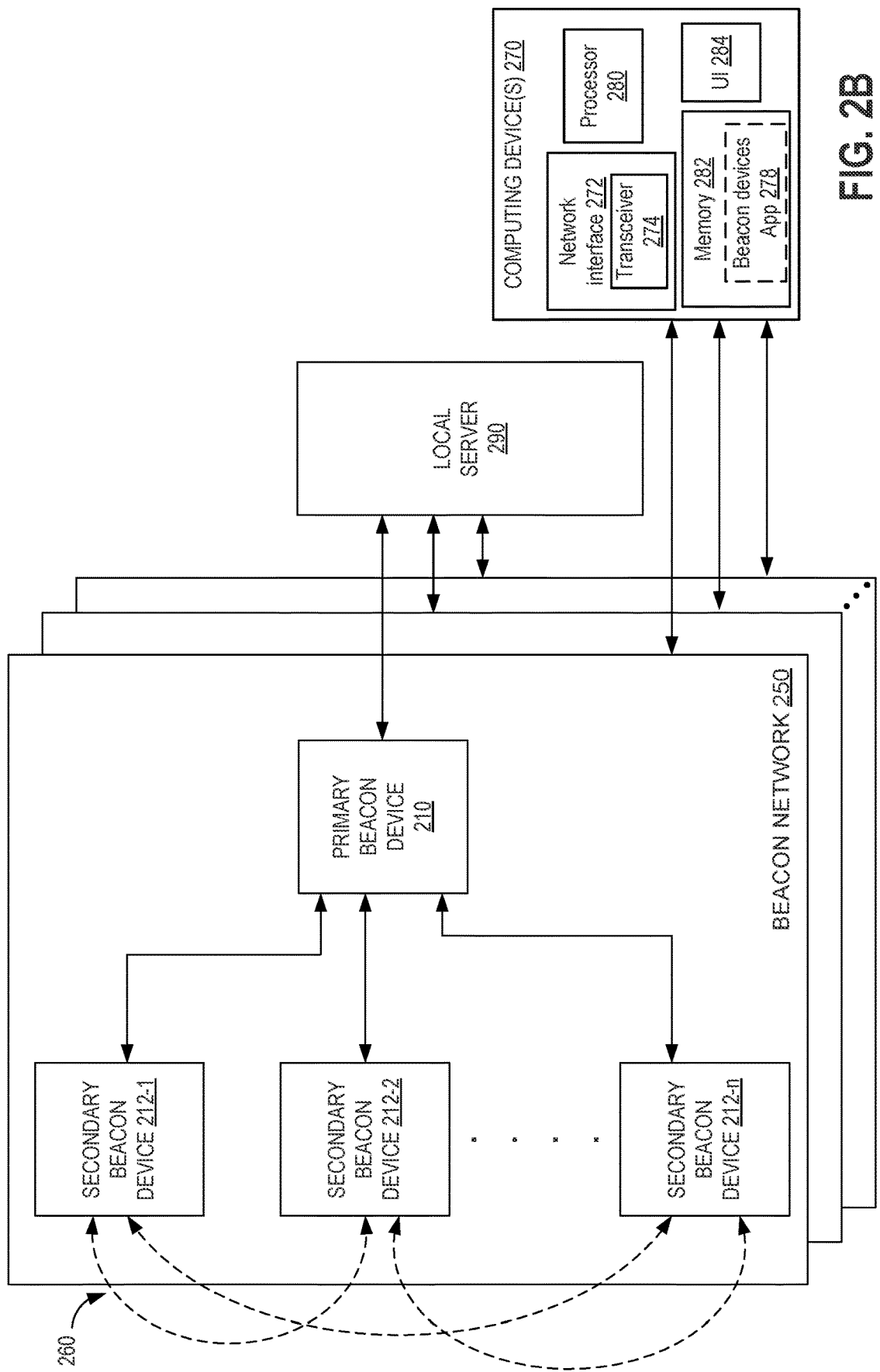
Figure 6:
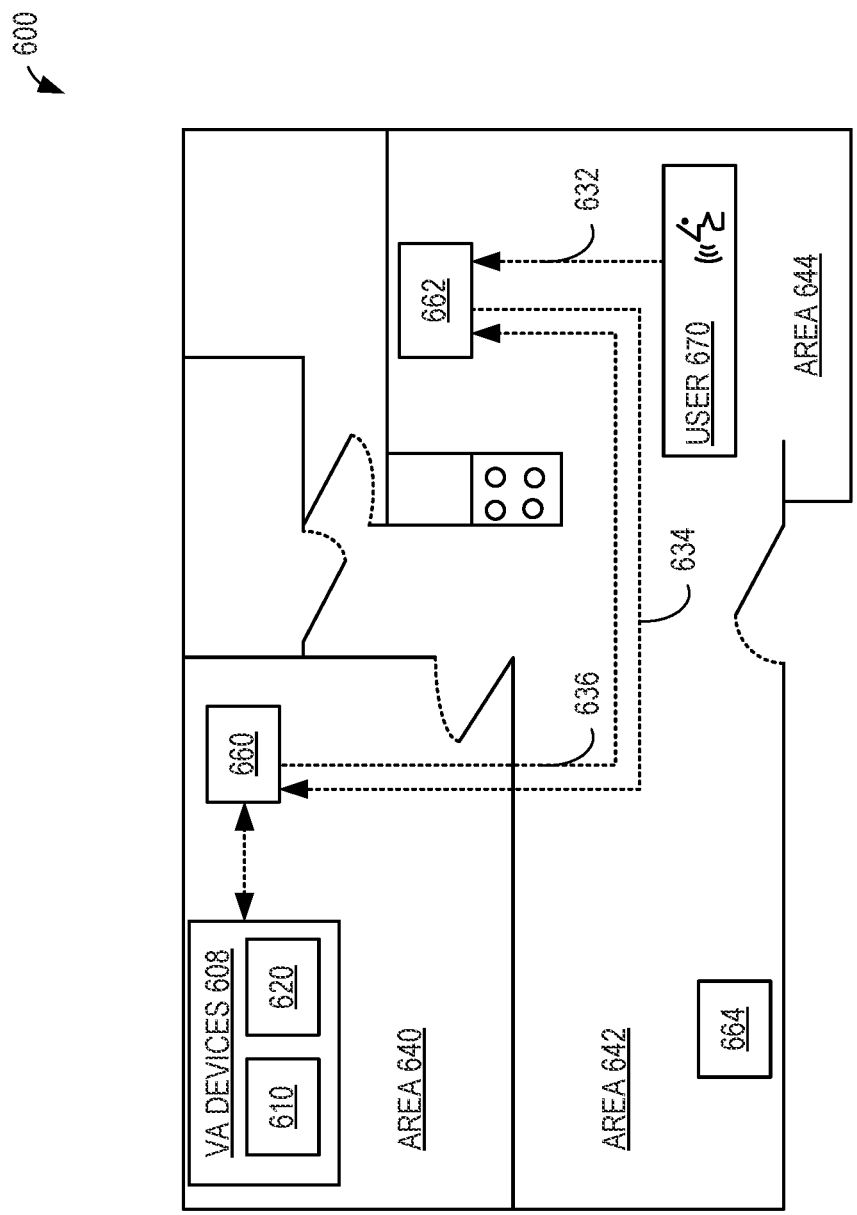
FIG. 6 shows a schematic illustration of an operating environment deploying a beacon network and example voice exchange when a single user requests a voice query in accordance with one or more embodiments of the present disclosure.
Figure 7:
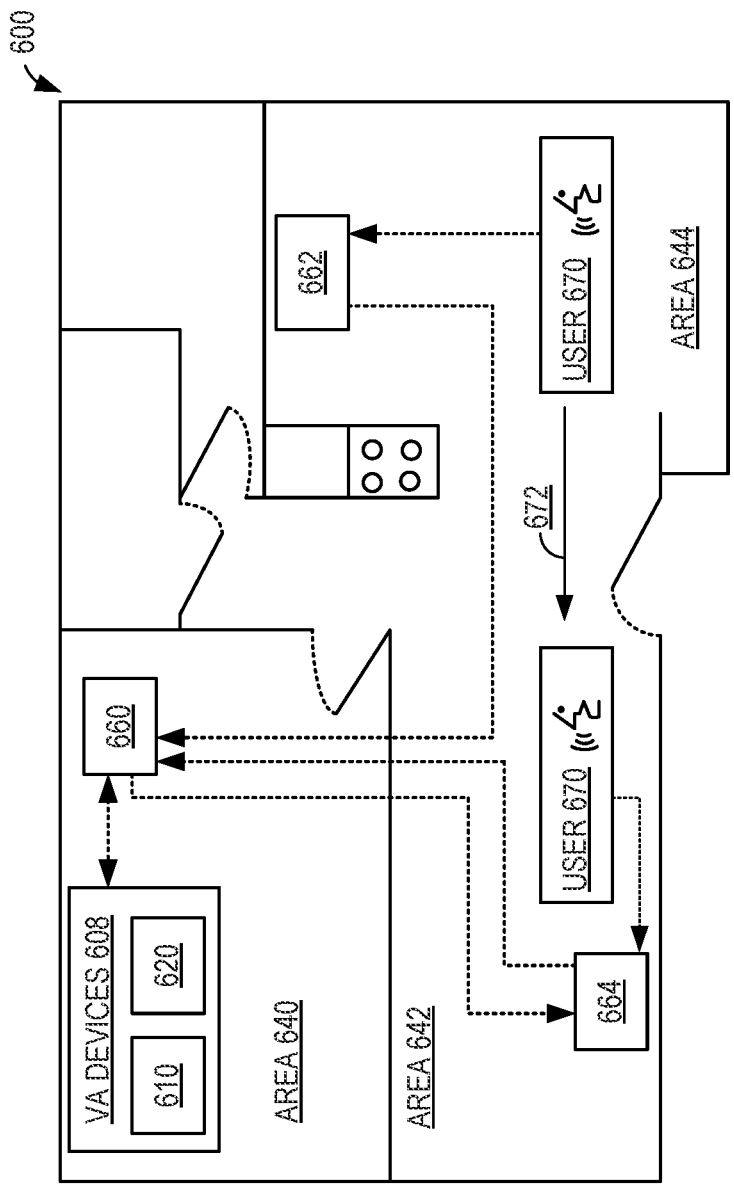
FIG. 7 shows a schematic illustration of an operating environment deploying a beacon network and example voice exchange when a single user requests a voice query while moving in accordance with one or more embodiments of the present disclosure.
Figure 8:
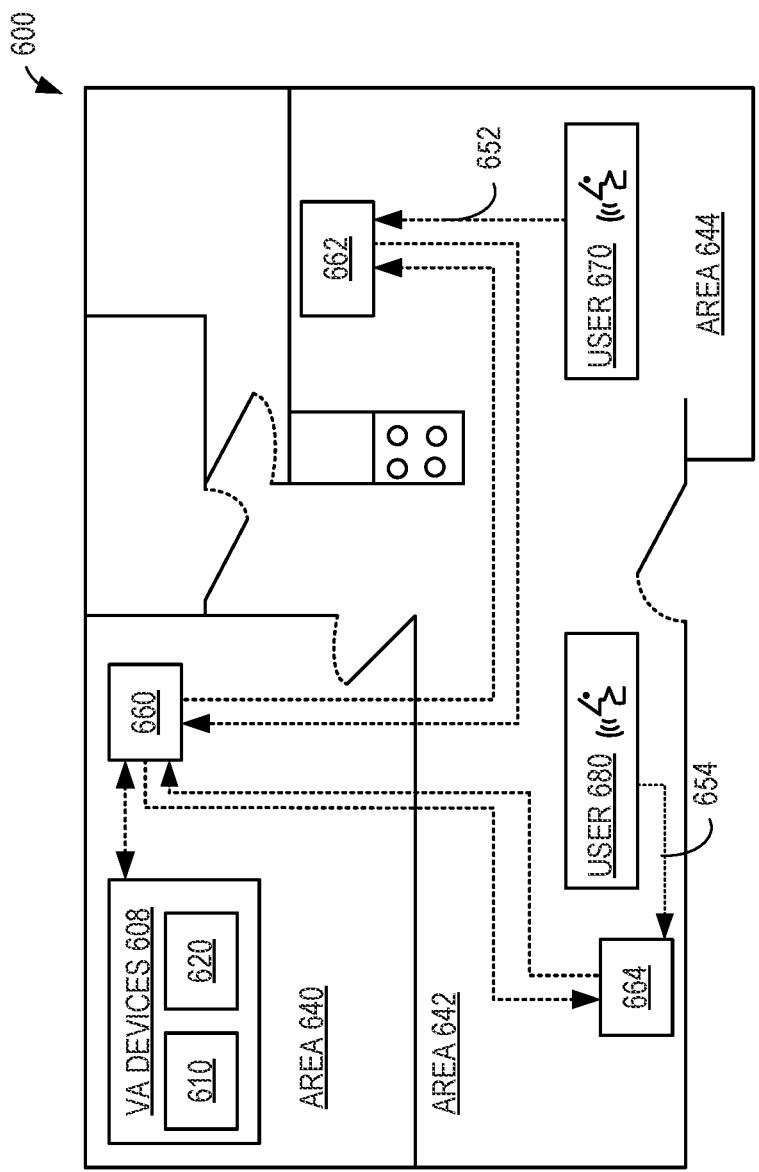
FIG. 8 shows a schematic illustration of an operating environment deploying a beacon network and example voice exchange when multiple users are involved in accordance with one or more embodiments of the present disclosure.
Figure 9:
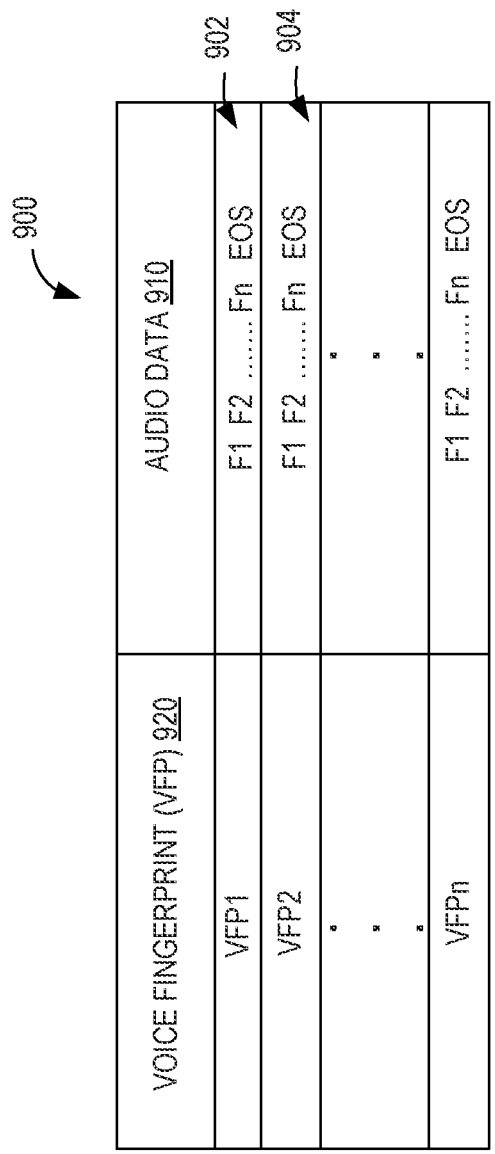
FIG. 9 shows an example hash table for queuing audio data corresponding to one or more voice queries received at the primary beacon device in accordance with one or more embodiments of the present disclosure.

Further, an example topology of the beacon network that may be employed in a home environment, a variety of business environments (e.g., office, hotel, cruise ships etc.) is shown at FIG. 2A. Another example topology of the beacon network that may be utilized in a large scale premises (e.g., airports, train stations, bus stations, etc.) is shown at FIG. 2B. When a user is not within a listening range of one or more voice assistants, the user may initiate a voice query to any of the one or more voice assistants via any of the secondary beacon devices. An example method for acquiring and processing the voice query by the secondary beacon device is described at FIG. 3. The secondary beacon device may receive the user's voice query to any of the one or more voice assistants and transmit the acquired audio data, the audio data including the voice query to a voice assistant, to the primary beacon device. When more than one secondary beacon device is used within the beacon network, multiple users may interact with different secondary beacon devices at the same time (or nearly the same time). The audio data may include voice query to a single voice assistant or to different voice assistants. Audio data captured at each secondary beacon device may be transmitted to the primary beacon device. An example method for processing the audio data at the primary beacon device is discussed at FIGS. 4A, 4B, and 5. The primary beacon device, may process the audio data including the voice query to any of the one or more voice assistants, identify the voice assistant to which the voice query is directed to, and transmit the audio data to the voice assistant. A voice assistant to which a voice query is directed to is also referred to herein as a requested voice assistant. Upon receiving the voice query from the primary beacon device, the requested voice assistant may generate a voice response and transmit the response to the primary beacon device. The primary beacon device may intelligently route the voice response to the secondary beacon device at which the voice query originated. An example operating environment of the beacon network, where a single user requests a voice query from a voice assistant among a plurality of voice assistants via the beacon network is illustrated at FIG. 6. An example data exchange in the beacon network when a user is moving is illustrated at FIG. 7, and an example data exchange through the beacon network when multiple users initiate voice requests at the same time (or nearly the same time) is illustrated at FIG. 8. Further, an example hash table generated by the primary beacon device when multiple voice queries are received at the primary beacon device is shown at FIG. 9.

In this way, the beacon network may provide a common interface for one or more users to interact with a plurality of voice assistants at a greater operating range. The above-described features and others will be described in more detail below.

FIG. 1A is a block diagram of an example primary beacon device (hereinafter primary beacon) 110 that is a part of a beacon network system, which provides a common interface for communicating with one or more voice assistant devices. Primary beacon 110 includes a memory device 112 (e.g., Random Access Memory [RAM], Read-Only Memory [ROM], flash memory, hard disk drives, and/or other hardware storage devices) storing instructions executable by a processor 114 to perform operations such as voice fingerprint analysis, wake word detection, signal strength analysis, and/or any of the operations or methods described herein. Memory 112 may further include instructions for tracking respective location of one or more secondary beacon devices in the beacon network, such as a secondary beacon device discussed below at FIG. 1B, and tracking a number of secondary beacon devices in the beacon network. Memory 112 may also include instructions for intelligently routing query responses to appropriate secondary beacon devices in the beacon network. In some examples, memory 112 may include instructions for executing an operating system or other applications on the primary beacon 110 and/or instructions to control other elements of the primary beacon 110.

Instructions may be stored on a single device and/or distributed across multiple devices, and instructions for a given operation may be organized as a module for performing that operation. For example, a voice fingerprint analysis module may include instructions executable by a processor to analyze received voice data and extract identifying components of the voice data for associating the voice data with a particular user and/or query.

A wake word detection module may include instructions executable by a processor to analyze detected voice data by comparing the voice data to a known audio samples corresponding to a predefined wake words of each of the voice assistants supported by the system. For example, if a plurality of voice assistants are included in the beacon network, the wake word detection may pass the detected voice data to each of the assistants for each assistant to determine whether its wake word has been detected.

In this way, each primary and secondary beacon has the capability to recognize wake words associated with voice assistants it is programmed to support. For example, if the system is set up with Google and Alexa, primary/secondary beacons will recognize both "OK Google" and "Hey Alexa" wake words.

As described above, although referred to as a "word," the wake word may include any string of speech and/or audio tone(s) used to indicate a start of a voice input (e.g., a voice query) and to control the primary beacon to start detecting and reporting detected voice data.

A signal strength analysis module may include instructions executable by a processor to analyze detected voice data to determine a strength or intensity (e.g., a decibel level or other indicator) at which the voice data is detected. A secondary beacon device tracking module may include instructions for tracking a number of secondary beacon devices in the beacon network. For example, as one or more secondary beacon devices are added or removed, the tracking module may monitor a total number of beacon devices and may also store a device identifier for each of the secondary beacon devices. In some examples, an interconnected beacon network may be employed that includes more than one primary beacon device, the primary beacon 110 may also track a total number of other primary beacon devices and corresponding device identifiers.

A response routing module may include instructions executable by a processor to identify a requesting secondary device transmitting a query, and route a response to the requesting secondary device. The response routing module may include further instructions to identify a last secondary beacon device that transmitted an end portion of a query (e.g., according to a signal strength, order of arrival of packets, etc.), and route a response to the last secondary beacon device.

In one embodiment, the primary beacon device 110 may include a query processing module that includes instructions for parsing one or more voice commands received from one or more secondary beacon devices to determine a query posed by a user. For example, the query processing module may include instructions executable by the processor(s) 424 to stitch together voice data received from more than one secondary beacon devices (e.g., due to two or more secondary beacon devices receiving portions of a query input as a result of the user moving from one location to another while posing the query) to build a voice query, and parse the voice query to determine what information is requested by the query. The query processing module may work with a speech recognition module in order to intelligently process the voice data and rebuild the query string.

In an example, voice data packets from one or more secondary beacons may be passed to the primary beacon for aggregation of the query string. When the primary beacon receives the data, it has already identified which voice assistant to which the aggregated query should be passed, and so passes the aggregated query accordingly.

In some examples, instead of generating a voice output, the voice query received (and parsed) at the primary beacon may be further processed (e.g., encoded) to be compliant with the requested voice assistant's application programming interface (API) and transmitted to a processor (e.g., cloud based server) of the requested voice assistant.

The instructions in memory 112 may be executed in coordination with operation of other hardware elements of the primary beacon 110, such as elements of a human-machine interface 120 and/or an antenna/communication interface 116. The human-machine interface 120 may include a microphone 124, a speaker 122, optional display (not shown), and/or other input device(s) (e.g., power and/or volume control elements 126, which may be any of or any combination of buttons, touch sensors, dials, knobs, etc.) that enable a user to interact with the primary beacon 110. For example, the microphone 124 may be used to acquire voice commands and/or acquire voice responses from the one or more voice assistants. In some examples, such as when deployed in a large operating environment, such as an airport, the microphone 124 may be a directional microphone in order to reduce capturing background audio. The speaker 126 may be used to output voice query (e.g., a user's voice query received from one or more secondary beacon devices) to the one or more voice assistants. In some examples, the speaker 126 may also be used to render responses received from one or more voice assistants to a user.

The antenna/communication interface 116 may include hardware interface elements to transmit and/or receive information from/to the primary beacon 110. In one example, the antenna/communication interface 116 may include a Bluetooth Low Energy (BLE) transceiver for wireless communication between the primary beacon 110 and one or more secondary beacon devices. Additionally or alternatively, the antenna/communication interface 116 may include one or more wireless transceivers that may be used for wireless (e.g., WIFI, BLUETOOTH, Near-Field Communication, 5G, etc.) communication between the primary and the secondary beacon devices. The antenna/communication interface 116 (e.g., via wireless transceiver) may be further used for communication (e.g., sending query, receiving response, etc.) between the primary beacon 110 and one or more voice assistants and/or one or more servers. In some examples, additionally the antenna/communication interface 116 may include a wired interface for enabling a wired connection to the primary beacon 110.

The primary beacon 110 may include a power source 118 for supplying electrical power to the primary beacon. In one example, the power source 118 may be one or more batteries (e.g., at least one built-in rechargeable battery). The primary beacon 110 may be additionally or alternatively operated using other power sources, such as an external AC power source (e.g., via an AC adapter).

Turning to FIG. 1B, it shows a block diagram of an example secondary beacon device 150 in the beacon network. The secondary beacon device 150 may be a node in the beacon network and may be utilized for communication between one or more users and one or more voice assistants through a primary beacon device, such as primary beacon 110 at FIG. 1A. As an example, the secondary beacon device 150 may receive voice commands from a user, wherein the voice command is directed to the one or more voice assistants communicating with the beacon network. The secondary beacon device 150 may then record and transmit the received voice command to the primary beacon device in the beacon network. Further, the secondary beacon device may receive a response to the voice command from the one or more voice assistants via the primary beacon device 110, and relay the received response to the user. The secondary beacon device 150 includes a memory 152, a processor 154, and an antenna/communication interface 156, which may include similar features to those described above with respect to memory 112, processor(s) 114, and antenna/communication interface 116. Memory 152 may store instructions executable by processor 154 to perform one or more selective operations including wake word detection, signal strength analysis and/or one or more methods described herein. In some examples, memory 152 may include instructions for executing an operating system or other applications on the secondary beacon 150 and/or instructions to control other elements of the secondary beacon 150.

Instructions may be stored on a single device and/or distributed across multiple devices, and instructions for a given operation may be organized as a module for performing that operation. For example, memory 154 may include a wake word detection module including instructions executable by a processor to analyze detected voice data by comparing the voice data to a wake words of each of the various assistants supported. As described above, although referred to as a "word," the wake word may include any string of speech and/or audio tone(s) used to indicate a start of a voice input (e.g., a voice query) and to control the closest beacon to start detecting and reporting detected voice data. In one embodiment, the wake word detection module of the secondary beacon 150 may include instructions for recognizing a start of voice query according to corresponding wake words for the one or more voice assistants in the beacon network of the secondary beacon 150. As a non-limiting example, the wake word detection module of the secondary beacon 150 may recognize a wake word for a voice assistant (e.g. "hey google", "alexa", etc.,) communicating with the beacon network of the secondary beacon 150 and determine the start of voice query by a user, responsive to which a recording may be initiated.

A signal strength analysis module may include instructions executable by a processor to analyze detected voice data to determine a strength or intensity (e.g., a decibel level or other indicator) at which the voice data is detected. The signal strength may be relayed to the primary beacon along with the voice query.

In some examples, when an inter-connected beacon network is employed, the inter-connected beacon network including more than one primary beacon device, the secondary beacon 150 may be initialized with respect to a selected primary beacon. When the selected primary beacon is unavailable, a different primary beacon (e.g., based on a ranking system) may be used for communications between the secondary beacon device 150 and one or more voice assistants.

Similar to the primary beacon device 110 discussed at FIG. 1A, the instructions in memory 152 may be executed in coordination with operation of other hardware elements of the primary beacon 110, such as elements of a human-machine interface 120 and/or an antenna/communication interface 156. The human-machine interface 160 may include a microphone 164, a speaker 162, optional display (not shown), and/or other input device(s) (e.g., power and/or volume control elements 166, which may be any of or any combination of buttons, touch sensors, dials, knobs, etc.) that enable a user to interact with the secondary beacon 150. For example, the microphone 164 may receive voice commands from a user, and the speaker 126 may be used to output a response to the voice command received from the primary beacon device, which receives the response from the one or more voice assistants. In some examples, such as when deployed in a large operating environment, such as an airport, the microphone 164 may be a directional microphone in order to reduce capturing background audio.

The antenna/communication interface 156 may include hardware interface elements to transmit and/or receive information from/to the secondary beacon 150. In one example, the antenna/communication interface 156 may include a Bluetooth Low Energy (BLE) transceiver for wireless communication between the secondary beacon 150 and one or more secondary beacon devices. Additionally or alternatively, the antenna/communication interface 156 may include one or more wireless transceivers that may be used for wireless (e.g., WIFI, BLUETOOTH, Near-Field Communication, 5G, etc.) communication between the primary and the secondary beacon devices.

The secondary beacon 150 may include a power source 158 for supplying electrical power to the primary beacon. In one example, the power source 158 may be one or more batteries (e.g., at least one built-in rechargeable battery). The secondary beacon 150 may be additionally or alternatively operated using other power sources, such as an external AC power source (e.g., via an AC adapter).

FIG. 2A shows a block diagram of an embodiment of a beacon network 250 that may be deployed to provide a common voice communication interface for a user to interact with one or more voice assistants as well as extend corresponding ranges of one or more voice assistants. The beacon network 250 may be deployed in a residential environment and/or large scale business environment (e.g., hotels, cruise ships, commercial complexes, etc.), for example. Another embodiment of a beacon network that may be deployed in a large/very large scale environment, such as an airport, is discussed below at FIG. 2B.

The beacon network 250 comprises of a primary beacon device 210 communicatively coupled to a plurality of secondary beacon devices 212-1, 212-2 ... 212-n, where n is a total number of secondary devices. An example primary beacon device and an example secondary beacon device are described above with respect to FIGS. 1A and 1B. The primary beacon device 210 is also communicatively coupled to a first voice assistant 220 and a second voice assistant 230, where the first voice assistant is different from the second voice assistant. In one example, the first voice assistant and/or the second voice assistant may be generic voice assistants (e.g., Amazon echo, Google home, etc.), a local application specific voice assistant (e.g., a hotel specific voice assistant that provides answers to specific hotel-related queries, ZOE cruise virtual assistant that provides cruise-related information in a cruise ship environment, etc.), or a combination thereof.

While the beacon network 250 is illustrated with one primary beacon device, more than one primary beacon device may be used according to the environment in which the beacon network is deployed. As a non-limiting example, in a hotel premises having 6 floors and having 12 rooms in each floor, each floor may employ one primary beacon and 12 secondary beacons, and each primary beacon in each floor may be communicatively coupled to one or more voice assistants on the respective floors. Similarly, a number of secondary beacon devices may be increased or decreased depending on a size of the environment (e.g., square footage of a hotel premises). Further, while the present example shows two different voice assistants, the beacon network 250 may be configured to be used with any number of voice assistants.

Data communication between each of the secondary beacons 212 and the primary beacon 210 may be carried out via any of a variety of wireless protocols including but not limited to Bluetooth Low Energy (BLE), WIFI, Bluetooth, Near-Field Communication, ZigBee, 6LoWPAN, Thread, Z-Wave, Bluetooth Smart, ISA100.11a, WirelessHART, and MiWi. In the beacon network 250, the primary beacon 210 is communicatively and operatively connected to the plurality of secondary beacons 212 in a hierarchical network topology. Further, the plurality of secondary beacons may be interconnected via a local non-hierarchical network topology 260 (e.g., mesh network), and the communication between the secondary beacons may be carried out via any of the variety of wireless protocols indicated above in a non-limiting manner.

Each secondary beacon device 212, in response to a wake word, may collect and communicate audio data (e.g., voice query from a user) to the primary beacon device 210, which then communicates with a requested voice assistant device through which information is requested (that is, a voice assistant to which query is directed to by the user). In one example, the primary device 210 may render, via a speaker, the audio data received from the secondary beacon device 212. The rendering may include a wake word directed to the requested voice assistant followed by a voice command. Further, the primary device 210 may be located within a listening range of the requested voice assistant, and when the audio data is rendered through the primary device 210, the requested voice assistant may receive the voice query (via the primary device) and communicate with its associated server and generate a response to the voice query. When the response is output by the requested voice assistant, via a voice assistant's speaker, the primary device may acquire the response (e.g., collect the audio response via a microphone, and record the complete response), and transmit the response to the secondary device from which the voice query was received. The process performed by the primary beacon, including communicating a voice query to a requested voice assistant, capturing a response from the requested voice assistant, and routing/transmitting the captured response to the secondary device through which the voice query was initiated is referred to herein as the query-response cycle.

FIG. 2A shows the first voice assistant 220 and its associated server VA1 server 280, and the second voice assistant 230 and its associated server VA2 server 282. Communications between the voice assistants and their associated servers (e.g., including transmitting a voice query received from the primary beacon, processing and parsing the voice query, determining and/or implementing a response to the query, and transmitting the response back to the voice assistant) may be carried out via a communication network 240. The communications network 240 may be the Internet, other wide area networks, local area networks, metropolitan area networks, and so on. In some examples, the primary beacon 210 may communicate voice queries to the voice assistant servers and receive responses from the voice assistant servers via the communications network 240 (indicated by arrow 242). The communications network 240 may be the Internet, other wide area networks, local area networks, metropolitan area networks, and so on.

The primary device 210 may receive multiple queries from the plurality of secondary devices in different locations within the operating environment of the beacon network 250. When multiple voice queries are received at the primary device 210, the primary device 210 may generate a queue according to a time of arrival of an end portion of each of the multiple voice queries and according to a voice fingerprint of the multiple queries. The primary device 210 may render each voice query according to an order in the queue. In one example, upon rendering a first voice query (e.g., the first query initiated by a first user and acquired via a first secondary beacon 220-1) to the requested voice assistant, the primary device 210 may complete a first query-response cycle for the first query before rendering a second query (the second query initiated by a second user and acquired via a second secondary beacon 220-2) to a second requested voice assistant. Details of generating the queue for multiple users, processing the voice query when a user is moving, processing a single stationary user's voice query, and additional implementations of the beacon network 250 will be described below with respect to methods described at FIGS. 3-5, and embodiments described at FIGS. 6-9.

In another example, the primary device 210 may process the received audio data (e.g., encode the audio data to be compliant with voice-assistant specific interface) and transmit, via the communications network 240, the processed audio data to a corresponding voice assistant server associated with the requested voice assistant.

The primary beacon 210 and the secondary beacon devices 212 in the beacon network 250 may be initialized in an operating environment using a computing device 270 and further, controlled (e.g., turn ON/OFF specific beacons) via the computing device 270. The computing device 270 may include a processor 280, a memory 282, a user interface (UI) 284, and a network interface 272, which may include a transceiver 274, as well as a display (e.g., screen or monitor) and/or other subsystems. The computing device 270 may be in the form of a desktop computing device, a laptop computing device, a tablet, a smart phone, or any other device configured to transmit data over a network. For example, a user deploying the beacon network 250 at their home may use an iPhone or iPad as the computing device 270 to set up (that is, initialize) and further control the primary and secondary beacon devices in the beacon network 250. Further, the computing device 270 may be communicatively coupled to the primary beacon 210 and the plurality of secondary beacons 212 in the beacon network 250. Data communication (e.g., for set-up control and operation control of the beacon devices) may be performed via a wireless network (e.g. Bluetooth Low Energy (BLE), WIFI, Bluetooth, Near-Field Communication, ZigBee, 6LoWPAN, Thread, Z-Wave, Bluetooth Smart, ISA100.11a, WirelessHART, and MiWi etc.). In one example, a beacon devices application software 278 may be installed on the computing device 270. The set-up of the beacon network and subsequent control of the primary and secondary devices in the beacon network may be performed using the beacon devices app 278. An example beacon network initialization will be described below with respect to the beacon network 250. The initialization may be performed once prior to using the beacon network, and further, as new beacon devices are added, the beacon network may be updated (or re-initialized) using the app 278.

A user may open the beacon devices app 278 on the computing device. Next, the user may turn on the primary beacon device 210. The beacon devices app 278 may recognize the primary beacon device 210, and in one example, may automatically classify the primary beacon device 210, using a zero-configuration network algorithm, as the primary beacon device. In another example, the user may configure a beacon device to operate as a primary beacon device. Next, the user may provide a location key to the primary beacon device 210 (e.g., primary kitchen). Upon setting up the primary device 210, the secondary beacon devices 212 may be set up one by one, by powering up each device, classifying the secondary beacon device, and providing a unique location key to each of the secondary beacon devices. In some examples, all the beacon devices in the network may be set-up simultaneously (e.g., using a device identifier). Once the set-up is complete, the beacon devices may be controlled via the beacon devices app 278. An example user interface of the beacon devices app 278 may show one or more beacon devices along with their location key in an operating environment.

Turning to FIG. 2B, it shows a block diagram of an example network architecture including the beacon network 250 (discussed at FIG. 2A), according to another embodiment. Herein, a plurality of beacon networks are deployed in a large scale operating environment, such as an airport, wherein the operating environment includes a local server 290 for handling requests from the plurality of beacon networks. As discussed with respect to FIG. 2A, each beacon network 250 of the plurality of beacon networks includes the primary beacon device 210 and the plurality of secondary beacon devices 212-1, 212-2 . . . 212-$n$. Each primary beacon 210 is communicatively coupled to the local server 290 via a communication network, such as communication network 240 discussed with respect to FIG. 2A. Thus, a plurality of primary beacons are communicatively coupled to the local server 290.

Local server 290 may be a query response server 290 and may include at least a memory, processor(s), and an antenna/communication interface. Local server 290 may be directly connected (or connected via intermediary device) to plurality of primary beacon devices 210 in order to receive voice data corresponding to a voice query and to send a voice query response. Memory may include one or more modules for processing voice data to parse the voice query and generate a voice query response. For example, memory may include a speech recognition module, which includes instructions executable by the processor(s) of the local server 290 to recognize speech within the voice data received from the plurality of primary beacon devices. Further, the memory may also include a query processing module, which includes instructions executable by the processor(s) to parse the voice query to determine what information is requested by the query, and generate a query response including the requested information.

As discussed with respect to FIG. 2A, the plurality of beacon networks may be initialized, and further controlled via one or more computing devices 270.

In this way, the beacon network 250 may be deployed in a wide-range of operating environments (e.g., home, business, airport, etc.) and may provide a common interface for one or more users to interact with different voice assistants (e.g., Amazon's Echo, Google home, etc.).

Figure 3:
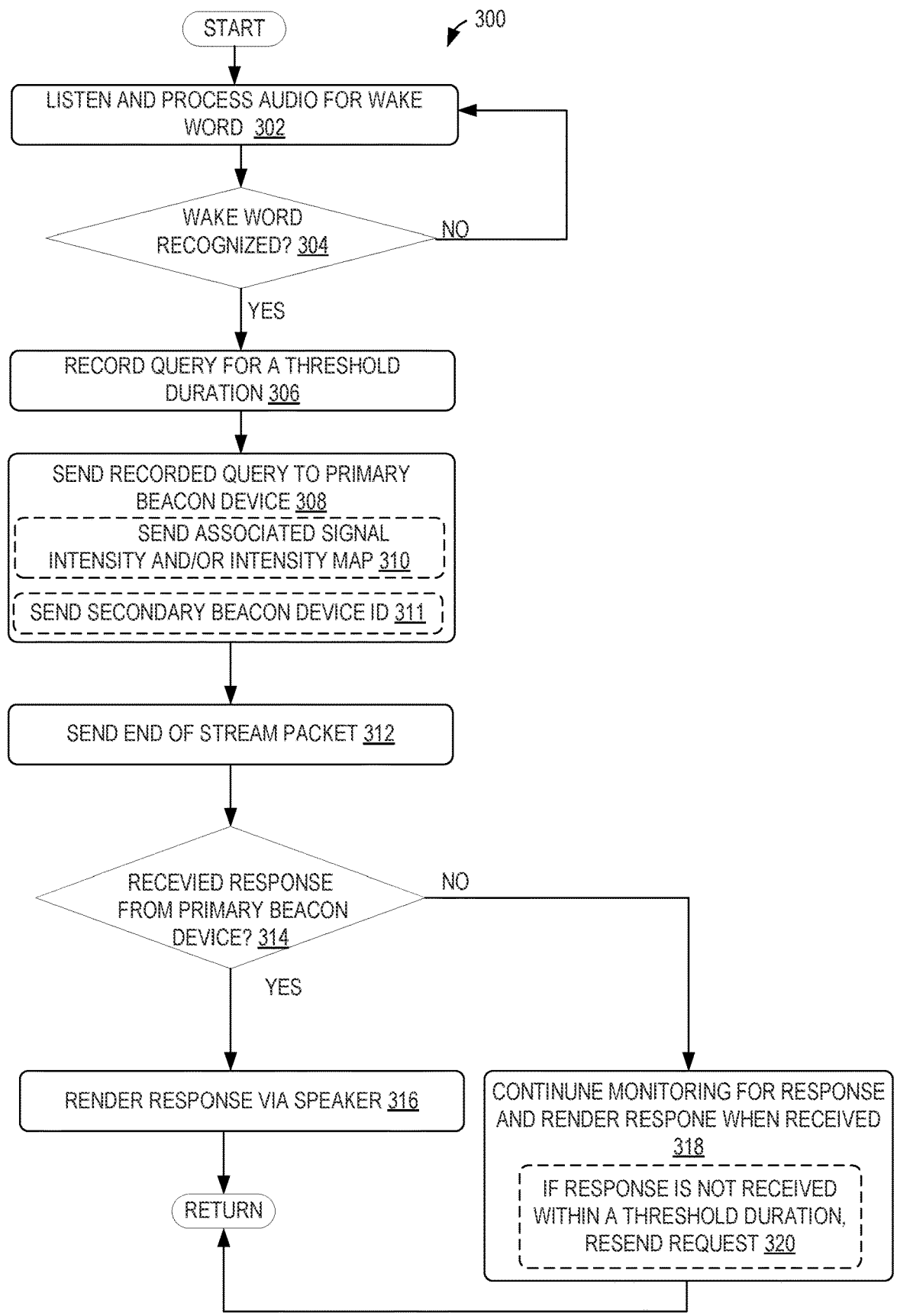
FIG. 3 is a flow chart illustrating an example method of handling voice data by a secondary beacon device in accordance with one or more embodiments of the present disclosure.

FIG. 3 shows a high level flow chart illustrating an example method 300 for handling a voice query from a user via a secondary beacon device in a beacon network. For example, method 300 may be performed by one or more secondary beacon devices, such as one or more secondary beacon devices 212 of the beacon network 250 of FIG. 2 or the secondary beacon device 150 at FIG. 1B. In particular, method 300 may be performed by a processor of whichever beacon is determined to be closest to the user according to the instructions stored in non-transitory memory.

At 302, method 300 includes listening and processing audio data for a wake word that is recognized by at least one secondary beacon device. As used herein, the wake word may be received in addition to voice data corresponding to a voice query or voice command (e.g., the wake word may be a separate input from a voice query). In one example, the secondary beacon device may recognize one or more wake words (e.g., "Ok, Google", "Alexa", etc.) corresponding to one or more voice assistants communicatively coupled to the beacon network. For example, the secondary beacon device may be configured to recognize a wake word for a voice assistant to which the user may direct a voice query via the beacon network of devices. In another example, the secondary beacon device may recognize a wake word that is associated with the secondary beacon device (e.g., "Hey VoiceEx" or "Hey Beacon" or "Beacon", among others that the secondary beacon device may be configured to recognize). In yet another example, the secondary beacon device may recognize a wake word that is associated with a location of the secondary beacon device (e.g., "Hey Kitchen VoiceEx" for a secondary beacon located in a kitchen when the beacon network is deployed in a home environment).

Next, at 304, method 300 includes determining if the wake word is recognized. If the answer is no, method 300 may continue to listen and process audio for detection of the wake word. If the wake word is recognized, method 300 proceeds to 306. At 306, method 300 includes recording a voice query or a voice command for threshold duration of time in response to wake word detection, and generate audio data corresponding to the voice query. In one example, when the wake word recognized is associated with a voice agent, the wake word and the voice query may be recorded for a threshold duration (e.g., the recording may include a voice assistant wake word and the voice query, such as, "Hey Alexa, add milk to my grocery list" or "Google, what is the forecast for today", etc.). Thus, while a wake word for the voice assistant to which the voice query is directed to may be recorded and included in the audio data, a wake word for a device in the beacon network may not be included in the audio data carrying the voice query to the voice assistant.

Next, at 308, method 300 includes transmitting the recorded query (that is, audio data) to a primary beacon device in the beacon network, such as primary beacon 110 at FIG. 1A or primary beacon 210 at FIG. 2A or 2B.

In some example, the secondary device is not in the range of the primary device in terms of direct communication, but is in a meshed network and so can communicate with the primary device via other intermediary secondary devices. In such an example, the recorded query is passed to another secondary device which is closer to primary device. As an example, the device may determine a closest path to the primary beacon via other secondary beacons if the primary beacon is not in range. Such information may be stored on each primary and secondary beacon in the network with such information determined when first setting up the network where the devices can positionally locate each other and keep a list in memory of which secondary devices are closest and whether there is a primary device within range. Further each device may store a plurality of paths to the secondary device and select a path in which the intermediary secondary devices have the least current processing demands to enable the fastest connection to the primary beacon. Thus, if there are concurrent requests to different voice assistants, for example involving intermediary beacons, a path that includes the least busy beacons may be selected.

In one example, data communication between the secondary beacon device and the primary beacon device may be carried out via a Bluetooth low energy protocol, and as such, the recorded data may be processed and transmitted from the secondary beacon device to the primary beacon device in packets. In addition to audio data, the secondary device may also transmit an audio signal intensity for the recorded query (at 310) as well as a device ID of the secondary beacon device that acquired the audio data (at 311). In some examples, a signal intensity map of the entire query recorded by the secondary beacon may be generated and transmitted to the primary beacon. While the present example describes signal intensity determination by the secondary beacon device, in some embodiments, one or more of an overall signal intensity and a signal intensity map may be determined at the primary beacon device.

After transmitting the voice query, an end of stream packet is transmitted to the primary beacon device at 312 to indicate end of transmission from the secondary beacon device. Processing of the voice query at the primary beacon device is discussed below with respect to FIGS. 4A, 4B, and 5.

Next, method 300 includes determining if a response to the voice query is received from the primary beacon. The answer is yes, at 316, method 300 includes rendering the response via a speaker of the secondary. The method then returns to start to continue listening for wake word. If the answer at 314 is no, method 300 may proceed to 318 to continue monitoring for response and the render response when received. In some examples, if a response is not received within a predetermined duration after transmitting the query, the voice query may be retransmitted or the secondary device may request the user to repeat the voice query. The method 300 then returns to start.

Figure 4A:
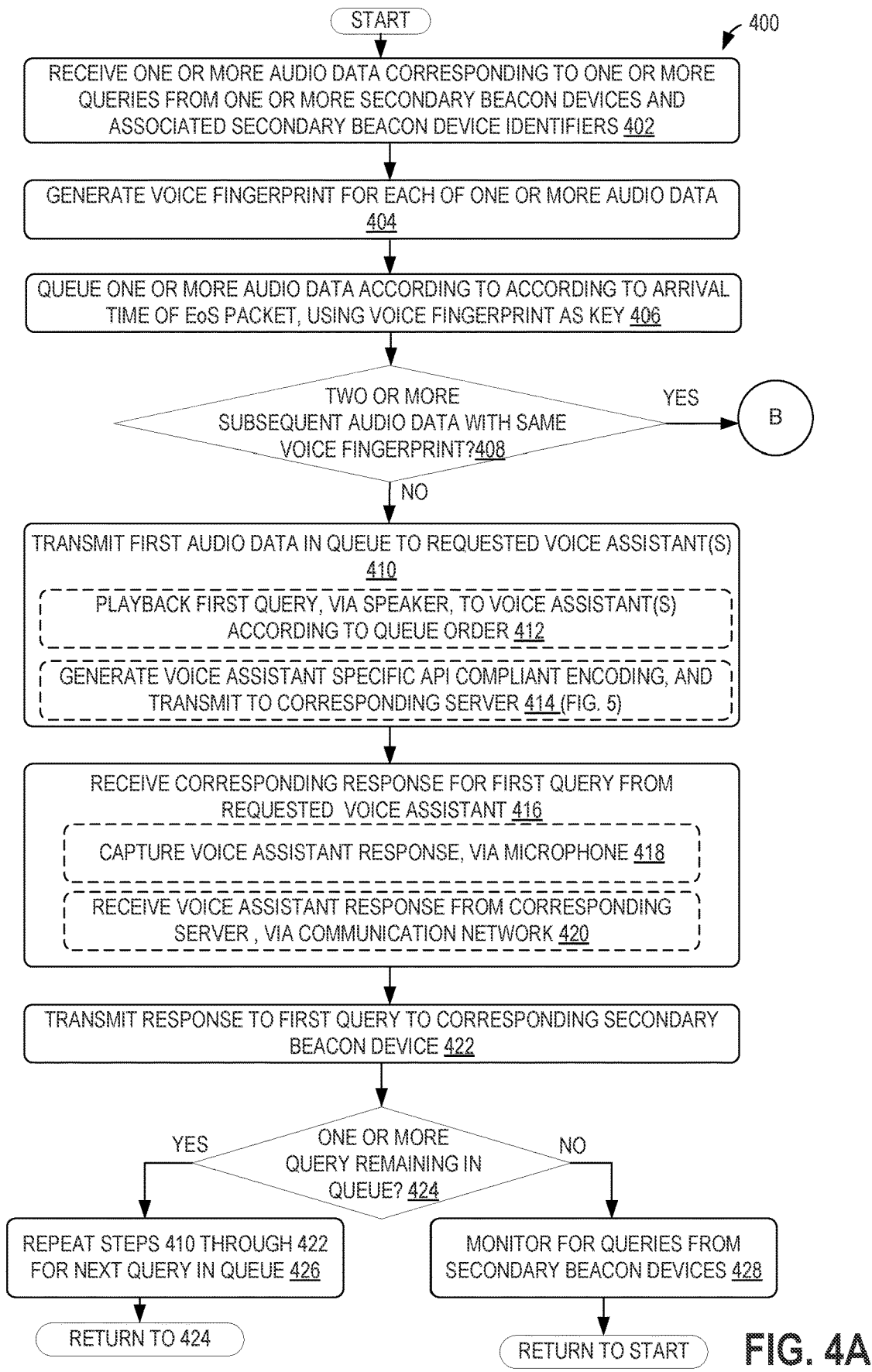
FIG. 4A is a flow chart illustrating an example method of handling voice data by a primary beacon device in accordance with one or more embodiments of the present disclosure.

FIG. 4A shows a high level flow chart illustrating an example method 400 for handling a voice query at a primary beacon device received from one or more secondary beacon devices in a beacon network. Method 400 may be performed by a primary beacon device, such as a primary beacon devices 210 of the beacon network 250 of FIG. 2A or the primary beacon device 110 at FIG. 1A. In particular, method 400 may be performed by a processor of the primary beacon device according to the instructions stored in non-transitory memory.

At 402, method 400 includes receiving one or more audio data corresponding to one or more voice queries from one or more secondary beacon devices in the beacon network. Each secondary beacon, in addition to a voice query, may transmit a secondary beacon device identifier, and an associated signal intensity to the primary device. As such, in addition to the audio data, the primary device may receive, from each secondary device, the associated device identifier indicating the secondary beacon that transmitted the voice query and the associated signal intensity of the voice query.

Next, at 404, method 400 includes generating a voice fingerprint for each of the one or more audio data corresponding to the one or more queries, and at 406, method 400 includes queueing the one or more audio data in a hash table with the corresponding voice fingerprint. In an example, audio data packet processing may be used to enable improved reassembly and/or aggregation of audio data packets so that regardless of the source (e.g., various secondary beacons, a combination of the primary beacon and secondary beacons, etc.), the query can be reconstructed quickly. For example, the voice fingerprint for each audio packet is calculated and Packets with similar fingerprints are collected together and aggregated to form a single voice query, where each packet belongs to a particular request.

In one example, the voice fingerprint of the audio data corresponding to the voice query from each secondary beacon may be used as a key to determine if the audio data from different secondary beacons belong to the same user (which may indicate that the user is moving) or different users are requesting different queries from different secondary beacons. An example hash table 900 is shown at FIG. 9.

Turning to FIG. 9, the hash table 900 may include one or more audio data of one or more voice queries from one or more secondary beacon devices (e.g., secondary beacon device 150 at FIG. 1B, secondary beacon device 212 at FIG. 2A etc.). The hash table 900 may be stored in a memory of a primary beacon device (e.g., primary device 110 at FIG. 1A, primary device 210 at FIG. 2A etc.). Each audio data 910 is shown in frames F1 F2 . . . Fn and including an End of Stream frame (EoS). Further, a voice fingerprint 920 corresponding to the audio data 920 is generated by the primary beacon device for each query and associated with the audio data.

Further, when the hash table 900 is generated, the one or more queries may be arranged according to a time of arrival of a corresponding end of stream packet, where a priority for a voice query in the queue is greatest for the earliest arrived end of stream packet. For example, a first audio data 902 of a first voice query from a first secondary beacon that transmits an earliest end of stream packet may be received at an earlier time by the primary beacon and therefore, receives higher priority in the queue than a second audio data 904 of a second voice query received from a second secondary beacon that transmits a second end of stream packet later than the first secondary beacon.

Figure 4B:
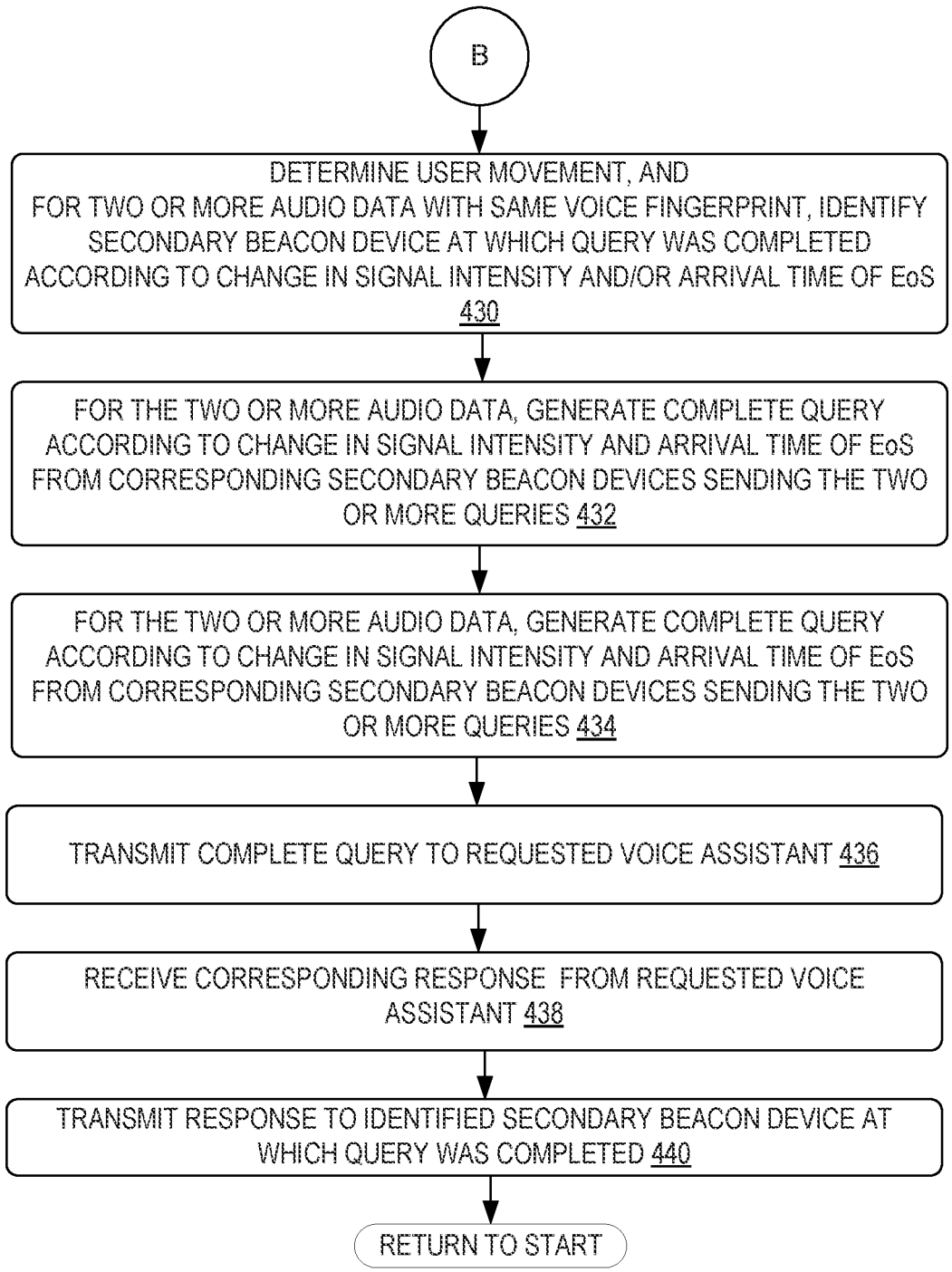
FIG. 4B is a continuation of FIG. 4A.

In this way, the hash table 900 may be used to queue multiple queries received from one or more secondary beacon devices as well as use voice fingerprints of the received audio data as a key to evaluate an operating status of the beacon network (e.g., to identify if multiple users are requesting different secondary beacons, if the same user is moving which causes different second beacons to send data streams corresponding to the same query), and process the audio data accordingly as further discussed below in the continued discussion of FIGS. 4A and 4B.

In some examples when a single query is received from one secondary device (e.g., a single stationary user interacting with the beacon network and initiating a single voice query), the hash table may not be generated.

Returning to FIG. 4A, Next, at 408, method 400 includes determining if two or more subsequent voice queries carry the same voice fingerprint. If the answer is YES, a user is moving and initiating a voice query while moving, and the method 400 proceeds to 430 at FIG. 4B (discussed further below). If the answer at 408 is NO, the method 400 may determine that the queries queued in the hash table have originated from different users at different secondary beacons, and method 400 proceeds to 410 to process the one or more queries in the order of priority.

At 410, method 400 includes transmitting a first audio data corresponding to a first query having a highest priority in the hash table to a requested voice assistant. In one example, as indicated at 412, the primary beacon device may playback the first query via a speaker of the primary beacon. The primary beacon device may be positioned within a threshold listening range of one or more voice assistants, and further, the query rendered by the primary beacon may include the wake word for the requested voice assistant. Therefore, the requested voice assistant may detect the wake word and receive the voice query. In one example, during initialization of the beacon network, the primary beacon may send a test query to the one or more voice assistants and receive a test response from the one or more voice assistant to determine a corresponding threshold listening range of the one or more voice assistants.

In another example, instead of rendering the voice query via the speaker, as indicated at 414, the primary beacon device may process the voice query to generate processed audio data that is compliant with an application interface of the voice assistant, and the processed audio data is transmitted to a corresponding voice assistant server via a communication network. An example method for processing the voice query at the primary beacon device is discussed at FIG. 5.

Figure 5:
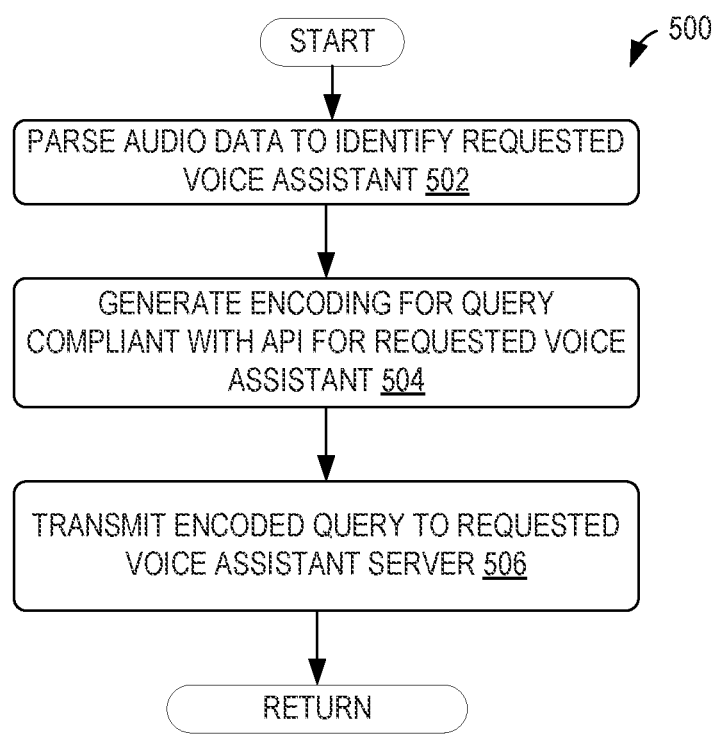
FIG. 5 is a flow chart illustrating an example method of processing voice data by a primary device prior to communicating voice data to a requested voice assistant in accordance with one or more embodiments of the present disclosure.

Turning to FIG. 5, it shows an example method 500 for processing audio data of a voice query at the primary beacon device. Method 500 may be executed by a processor of the primary beacon device according to instructions stored in a memory of the of the primary beacon device.

Method 500 begins at 502. At 502, the method 500 optionally includes parsing the voice query to identify the requested voice assistant in the voice query. However, as noted above, in another example each assistant is available and can receive the inquiry and then only the assistant that was called reacts to the query.

In an example, each secondary beacon has wake word detection and sends the wake word/phrase to the primary beacon to avoid repetition. Further, the primary beacon then performs recognition of the wake word for the supported voice assistant only when the primary beacon is the nearest beacon to the user as explained herein.

In one example, a (primary and/or secondary) beacon device may first identify that the audio data includes a voice query to a voice assistant by breaking down the audio data to words/phrases and matching a keyword via a map to a voice query command identifying the keyword as a query to a voice assistant. Upon identifying the requested voice assistant, the method 500 proceeds to 506. At 506, the method includes generating an encoding for the voice query, wherein the encoding is compliant with an application programming interface of the requested voice assistant.

Next, at 508, the method 500 includes transmitting the voice assistant compliant encoded voice query to a corresponding server of the requested voice assistant.

In this way, instead of outputting user voice including the voice query via the speaker of the primary beacon device, the primary beacon device may directly communicate via a respective application interface of the requested voice assistant.

Next, at 416, method 400 includes receiving a first response for the first query from the requested voice assistant. In one example, the voice assistant may render the response via a voice assistant speaker, which may be captured by the primary beacon via a microphone (418). For example, upon sending the first voice query request to the requested voice assistant, the primary beacon may monitor for a first response (to the first query) from the voice assistant and may not initiate a next query until the first response to the first query is received. When the voice assistant renders the first response as a voice response, the first response is captured by the microphone of the primary beacon.

In another example, the primary beacon may receive the first response to the first query from the requested voice assistant server via the communication network (420). Upon receiving the first response, the primary beacon device may transmit the response to the secondary beacon device that initiated the first query. For example, the primary beacon device may match the secondary beacon device with the first query according to one or more of a voice fingerprint of the query and a device identifier of the secondary beacon device which transmitted the first query.

Upon serving the first query, method 400 proceeds to 424. At 424, method 400 includes determining if one or more queries are remaining in the hash table queue. If YES, method 400 repeats steps 410 through 422 for the next query in the queue until all the queries are served. If the answer at 424 is NO, the method 400 proceeds to 428 to monitor for queries from one or more secondary devices in the beacon network.

Returning to step 408, if two or more subsequent queries in the hash table have the same voice fingerprint, the method 400 proceeds to 430 at FIG. 4B. In particular, FIG. 4B shows example processing of the two or more queries that have the same voice fingerprint at a beacon device, such as the primary beacon.

When a query from more than one beacon has a similar or the same voice fingerprint, user movement might be possible. As explained herein, in this case, audio data packets from two (or more) devices are combined together to create a single aggregated query using the fingerprint information at a beacon receiving the various packets, such as the primary beacon. For example, as a user moves from being closer to one secondary beacon to another secondary beacon, both send voice packets to the primary (either directly, or indirectly, as noted herein) and the primary is able to aggregate them together based on the fingerprinting. In an example, the primary beacon may utilize the last sent packet to identify which beacon is the closest currently to the user for providing a response to the query.

At 430, responsive to two or more queries with the same voice fingerprint, the method 400 may determine user movement. Further, a time delay between the arrival of end of stream packets for the two or more queries with the same voice fingerprint, a sequence of arrival of the two or more queries, and/or a change in signal intensity in each of the two or more queries may be used to determine that the two or more queries are different portions of the same query and are sent by different secondary beacons due to user movement.

For example, a user may initiate a voice query at a first location via a first secondary beacon at the first location and complete the voice query at a second location via a second secondary beacon. As a result, a first portion of the voice query is transmitted from the first secondary beacon and a second portion of the voice query is transmitted from the second secondary beacon. The primary beacon may receive the first portion and an end of stream (EoS) packet for the first portion at a first earlier time point and receive the second portion and an EoS packet for the second portion at a second later time point. Further, the first and the second portions may arrive at the primary device in a subsequent manner without a significant time delay. The primary beacon may then process the received first and second portions to determine a first voice fingerprint and a second voice fingerprint respectively. Since the first portion and the second portion are parts of the same query from a single user, the first and the second voice fingerprints are the same, responsive to which the primary device may determine that the user is moving. Further, the time delay (less than threshold) between arrival of the first portion and the second portion, as well as a change in intensity of first portion and a change in intensity of the second portion, may be used to determine that first portion and the second portions are parts of the same query and that the user was moving while delivering the voice command.

Further, at 430, the method 400 may include identifying a last secondary beacon device at which the query was completed. For example, the last secondary beacon device at which the voice query was completed may be determined according to one or more of a time of arrival of EoS packets, a sequence of the arrival of EoS packets, and the change in intensity of each voice query from one two or more queries with the same voice fingerprint. The last secondary beacon device at which the voice query ended may provide an indication of a final location of the user so that the primary device may route the response to the secondary device at the final location of the user.

Next, at 432, the method 400 includes for two or more queries with the same voice fingerprint, generating a complete query according to one or more of a change in signal intensity of each voice query and a time of arrival of EoS packets. Continuing with the example discussed above at 430, the first portion from the first secondary beacon and the second portion from the second secondary beacon may be processed to generate a complete query including the first and the second portions.

Next, at 434, method 400 includes transmitting the complete query to the requested voice assistant. As discussed at 410, in one example, the completed query may be rendered via the speaker of the primary beacon, and in another example, the completed query may be encoded according to an application interface of the requested voice assistant, and transmitted to the corresponding server of the requested voice assistant via the communications network.

Next, at 438, the method 400 includes receiving a response to the query from the requested voice assistant. As discussed at 416, in one example, the response to the competed query may be rendered via the speaker of the requested voice assistant, and the rendered response may be captured by the microphone of the primary beacon device. In another example, the response to the completed query may be received via the communications network from the server of the requested voice assistant.

Upon receiving the response, at 440, method 400 includes transmitting the response to the secondary beacon device at which the query was completed.

The method then returns to start and may continue to receive queries from one or more of the secondary devices.

In this way, the beacon network may provide a common platform for a single user or multiple (e.g., two or more) users to interact with one or more voice assistants. Further, the beacon network may detect movement of the single user and/or location of each user, and route the response to the secondary beacon at the last location of the single (moving) user or to the corresponding secondary beacon at the location of each user. Furthermore, the beacon network including primary and the secondary beacon devices is scalable at various levels and may be deployed in various premises (small scale residential to very large scale, such as airport). Further still, the beacon network provides a cost-effective solution to increasing a range of any number of voice assistants and allows a user the choice of initiating voice query/command with their preferred voice assistant by providing the common interface for the user to interact with.

Example implementations of a beacon network, such as beacon network 250 at FIG. 2A, in an example home operating environment is discussed below with respect to FIGS. 6, 7, and 8.

FIG. 6 shows a schematic illustration of an example audio data exchange within a beacon network in an example environment 600, wherein the beacon network comprises a primary beacon 660, a first secondary beacon 662, and a second secondary beacon 664. In particular, FIG. 6 depicts an example audio data transmission when a single stationary user initiates a voice query.

Primary beacon 660 may be an example of primary beacon device 110 at FIG. 1A or primary beacon device 210 at FIG. 1A. Secondary beacon devices 662 and 664 may be examples of secondary beacon device 150 at FIG. 1A or secondary beacon devices 212. Primary beacon 660 may be positioned within area 640 and within a listening range of voice assistant (VA) devices 608 including a first voice assistant 610 and a second voice assistant 620. The first secondary beacon 662 is located at within area 644 and the second secondary beacon 664 is within area 642, where areas 644 and 642 are not within the listening range of the VA devices 608.

A user 670 may be at area 644 and may initiate a voice input 632 directed to the first voice assistant 610 using a wake word that is detectable by the first secondary beacon 662 and/or the second secondary beacon 664. In one example, both the first secondary beacon 662 and the second secondary beacon 664 may detect the wake word, however, since the user in the area 644 within which the first secondary beacon 662 is located, an intensity of the user's voice sensed by the first secondary beacon 662 may be greater than an intensity of the user's voice sensed by the second secondary beacon 664. As a result, the first secondary beacon 662 may initiate recording of the voice query. For example, both the first and the second secondary beacons may exchange intensity information, and the secondary beacon that captures a greater user voice intensity may be negotiated to initiate the recording. The above mentioned negotiation may be performed at any of the secondary beacon devices, for example. In some examples, both the beacons 662 and 664 may record the query, however since the intensity of the voice query is greater for an entire duration of the recording, only the beacon (in this example, 662) that captures the greater intensity transmits the recorded voice query.

In another example, only the first secondary beacon 662 may detect the wake work, and as such the first secondary beacon 662 may initiate recording of the user's voice query or voice command.

A recorded voice query 634 (that is, audio data) is then transmitted, via a BLE protocol for example, from the first secondary beacon 662 to the primary beacon 660. The secondary beacon 662 may also transmit a first device ID of the first secondary beacon 662 (that is, its own device ID), an associated signal strength of the voice query 632 and/or an intensity map of the voice query, and an end of stream (EoS) packet to indicate end of voice query. The primary beacon may then parse the audio data from the secondary beacon device 662 to determine if the voice query is compatible with VA devices 608 (e.g., the primary beacon device may determine if a wake word for one of the VA devices is included in the recorded voice query 636 followed by information that is requested from one of VA devices 608 and if required, the primary beacon 660 may perform some rudimentary speech processing. For example, the voice input 632 may include a wake word for the secondary beacon device 662, and the primary beacon 660 may process the recorded voice query 634 received from the secondary beacon 662 to remove the wake word for the secondary beacon device while maintaining the requested voice assistant's wake word. Upon processing the recorded voice query 634, the primary beacon 660 may render the recorded voice query via a speaker of the primary beacon device.

In another example, the primary beacon 660 may parse the recorded voice query 634 to determine which VA device the information is requested from (that is, determine the requested VA device, which in this example may be 610 or 620), and generate an encoding of the voice query 634 that is compatible with an application interface of the requested voice assistant and transmit the query to a corresponding voice assistant server (VA server) of the requested voice assistant via a communications network, such as communications network 240 at FIG. 2A.

The requested voice assistant (610 or 620), in response to the voice query rendering by the primary device, may generate a response and output the response via a speaker of the requested voice assistant. Alternatively, in response to the VA server receiving the encoded query from the primary device, a response generated at the server may be delivered to the requested voice assistant or transmitted to the primary device via the communications network. When the response is rendered via the speaker of the requested voice assistant, the response is captured by the primary beacon and the response is subsequently transmitted (indicated by 636) to the first secondary device 662 that sent the recorded voice query 634. The response is then rendered to the user 670 in the area 644 by a speaker of the first secondary beacon 662.

In one example, when the user is within a listening range of the VA devices 608, the primary beacon device 660, according to signal intensity of the user's voice sensed by the primary device, may determine that the user is within a listening range of the one or more voice assistants, and therefore, may not initiate recording of voice query. Each type of voice assistant may have a different listening range, and as such a threshold voice intensity above which the primary beacon device may determine that the user is in the listening range of the voice assistant may vary according to the voice assistant. The respective threshold voice intensity for each voice assistant may be determined during an initialization process of the beacon network.

FIG. 7 shows a schematic illustration of an example audio data exchange within the beacon network in the example environment 600 when a single user initiates a voice query at a first location within area 644 and completes the voice query at a second location within area 642.

In this example, a wake word in the user's voice input is recognized by the first and the second secondary beacons 662 and 664, and both the beacons 662 and 664 record the voice query. However, due to user movement (indicated by arrow 672) a first portion of the voice query is captured by the beacon 662 at a first higher intensity while a second portion of the voice query is captured by the beacon 662 at a second lower intensity. Further, due to the user movement, with respect to beacon 664, the beacon 664 captures the first portion at a third lower intensity and the second portion at a fourth higher intensity. While the above example is described using two intensities for each beacon, it may be noted that the signal intensity may have a gradient change from higher to lower at the first secondary beacon 662, and a second gradient change from lower to higher at the second secondary beacon 664.

In response to the detected change in intensity, in one example, the first portion of the voice query may be transmitted by the first secondary device 662 while a second portion of the voice query may be transmitted by the second secondary device 664. That is, the voice portions with higher intensities may be transmitted from respective secondary beacons. As a result, the primary beacon 660 may receive the first portion from the beacon 662 and the second portion from the beacon 664. The primary beacon may that process the first and the second portions using voice fingerprinting, time of arrival of EoS, and/or changes in signal intensity to generate a complete query. In another example, both the secondary beacons 662 and 664 may transmit the entire query, and the primary beacon device, using voice fingerprint, time of arrival of EoS, and/or changes in signal intensity may generate a single complete query. In any case, the primary beacon 660 may process audio data received from the first beacon device 662 and the second beacon device 664 to determine that the user is moving and that the a single query is requested from a single user moving from one area 644 to another area 642, and generate a single complete query which is then transmitted to the requested VA device as discussed above at FIG. 6. The response from the VA is then received at the primary beacon, also as discussed above at FIG. 6. The primary beacon 660 identifies the secondary beacon device where the query ended based on one or more of change in signal intensity and time of arrival of EoS, and the primary beacon 660 transmits the response received from the requested VA device to the identified secondary beacon device at which the query ended, which is 664 in this example. The response is then rendered via the speaker of the secondary beacon device 664 in the area 642.

In this way, the beacon network may detect user movement and intelligently route the response to the appropriate secondary beacon.

FIG. 8 shows a schematic illustration of an example audio data exchange within the beacon network in the example environment 600 when two users ask queries via two different secondary beacons. In particular, the user 670 may request a first voice query 652 via the first secondary beacon 662 and a second user 680 may request a second voice query 654 via the second secondary beacon 664. The first and the second secondary beacons 662 and 664 may record and transmit the first and the second queries respectively to the primary beacon 660. In addition to audio data of the first query, the beacon 662 may transmit a first average signal intensity (and/or a first signal intensity map of the first query) of the first query, a device ID of the beacon 662, and a first EoS packet indicating end of stream of the first query. Similarly, the second secondary beacon may transmit a second average signal intensity (and/or a second signal intensity map of the second query) of the second query, a device ID of the beacon 664, and a second EoS packet indicating end of stream of the second query.

The primary device 660 may receive a first audio data of the first query from the first secondary beacon 662 and a second audio data of the second query from the second secondary beacon 664. When the primary device 660 receives the first audio data and/or the second audio data, the primary device generates a first voice fingerprint for the first audio data and a second voice fingerprint for the second audio data. The first and the second audio data, and the associated first and the second voice fingerprints are stored in a hash table in the primary beacon device 660. Due to different users requesting queries from the two beacons 662 and 664, the first voice fingerprint is different from the second voice fingerprint. Further, depending on respective times of arrival of the respective first and second EoS from the first secondary beacon 662 and the second secondary beacon 664, the first and the second audio data may be assigned priority in a queue of the hash table, wherein a first arriving EoS receives higher priority for serving the query. An example hash table is described with respect to FIG. 9.

If the first EoS from the first secondary beacon 662 arrives first and the second EoS from the second secondary beacon 664 arrives later than the first, the first audio data is assigned higher priority, and as such is processed first by the primary beacon 660. As discussed above with respect to FIG. 6, processing the first audio data may include transmitting the first audio data of the first query to the requested voice assistant (610 or 620). The primary device then receives a first response to the first query from the requested voice assistant, and transmit the first response to the first secondary beacon 662 which captured the first query from the first user. The first secondary beacon 662, upon receiving the first response from the primary beacon 660, may render the first response to the first user via the speaker of the first secondary beacon 662. Upon transmitting the first response to the first secondary beacon 662, the primary beacon device 660 may proceed to process the next query in queue (that is, the second query) as discussed above at FIG. 6, and transmit the second query to the requested voice assistant. Upon receiving a second response to the second query from the requested voice assistant, the primary beacon device may transmit the second response to the second secondary beacon 664 that captured the second query. The second secondary beacon device 664, upon receiving the second response may render the second response via the speaker of the beacon 664.

In this way, multiple users may interact (query and receive response) with multiple voice assistants using the beacon network as a common interface at the same time or nearly the same time (allowing some time difference for processing the first query and rendering the first response, and then proceeding to the next query).

The description of embodiments has been presented for purposes of illustration and description. Suitable modifications and variations to the embodiments may be performed in light of the above description or may be acquired from practicing the methods. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method comprising:
acquiring, via a secondary beacon device of a plurality of secondary beacon devices and a corresponding microphone of the secondary beacon device, audio data corresponding to a voice input from a user, the voice input including a voice query to a voice assistant;
transmitting the audio data from the secondary beacon device to a primary beacon device;
processing the audio data at the primary beacon device, and transmitting the processed audio data from the primary beacon device to the voice assistant, wherein processing the audio data includes the primary beacon device generating a voice fingerprint for the received audio data, and wherein the voice fingerprint is used by the primary beacon device to queue the processed audio data prior to the transmission;
receiving, at the primary beacon device, a voice response to the voice query from the voice assistant;
transmitting the voice response from the primary beacon device to the secondary beacon device; and
rendering the voice response at the secondary beacon device,
wherein the primary beacon device is positioned within a voice detection range of the voice assistant; and
wherein transmitting the processed audio data from the primary beacon device to the voice assistant includes rendering the voice query via a speaker of the primary beacon device, and wherein the voice query includes a wake word corresponding to the voice assistant.

2. The method of claim 1, wherein the primary beacon device is communicatively coupled to the voice assistant; and wherein transmitting the processed audio data from the primary beacon device to the voice assistant includes transmitting the audio data to one or more servers of the voice assistant.

3. The method of claim 1, further comprising:
responsive to the primary beacon device receiving more than one audio data from one or more of the plurality of secondary beacon devices, generating a hash table including the received audio data and a corresponding voice fingerprint for each of the received audio data; assigning a priority to each received audio data according to one or more of the voice fingerprint of the received audio data and a time of arrival of an end portion of the audio data; and transmitting the received audio data to a corresponding requested voice assistant according to the priority of each received audio data.

4. The method of claim 3, further comprising:
responsive to a voice fingerprint match among two or more audio data in the hash table, determining user movement and in response, generating a complete query using the two or more audio data with the fingerprint match, and transmitting the completed query to a requested voice assistant identified in the completed query.

5. The method of claim 4, further comprising:
responsive to determining user movement, identifying a last secondary beacon device at which a user completed a moving voice query; wherein the last secondary beacon device is determined according to a change in signal intensity in each of the two or more audio data with the voice fingerprint match and/or according to a corresponding time of arrival of a corresponding end portion of each of the two or more audio data.

6. The method of claim 3, further comprising:
receiving, at the primary beacon device, a corresponding voice response from the corresponding requested voice assistant, and routing the received voice response to a corresponding secondary device according to a respective device ID of the corresponding secondary device.

7. The method of claim 1, wherein data transmission between the primary beacon device and each of the plurality of secondary beacon devices occur via a Bluetooth low energy protocol.

8. The method of claim 1, wherein processing the audio data at the primary beacon includes parsing the audio data and identifying the voice assistant to which the voice query is directed to.

9. A beacon network, comprising:
a primary beacon device including a speaker, a microphone, a processor and a memory; and
one or more secondary beacon devices communicatively coupled to the primary beacon device; each of the one or more secondary beacon devices including a secondary beacon speaker, a secondary beacon microphone, a secondary beacon processor and a secondary beacon memory;

wherein the memory of the primary beacon stores instructions executable by the processor to:
  receive audio data from each of the one or more secondary beacon devices, the audio data from each of the one or more secondary beacon devices detected via the secondary beacon microphone of each of the one or more secondary beacon devices, each audio data including a voice query to a requested voice assistant;
  process the audio data from each of the one or more secondary beacon devices via the primary beacon device,
  wherein processing the audio data includes the primary beacon device generating a voice fingerprint for the audio data for each of the one or more secondary beacon devices,
  wherein the voice fingerprints are used by the beacon device to assign a priority and queue the processed audio data from each of the one or more secondary beacon devices; then
transmit each voice query to the requested voice assistant according to the priority assigned to each voice query;
receive a voice response to each voice query from the requested voice assistant; and transmit the voice response to a corresponding secondary beacon device from which each voice query originated;

wherein the requested voice assistant is any of one or more voice assistants communicatively coupled to the primary beacon device and wherein the primary beacon device is within a corresponding listening range of the one or more voice assistants.

10. The beacon network of claim 9, wherein a plurality of voice assistants are available to the beacon network, and wherein the requested voice assistant is one of the plurality of voice assistants.

11. The beacon network of claim 9, wherein, during an initialization condition, the primary beacon device initiates a test query to each of the one or more voice assistants to and receives a test response from each of the one or more voice assistants to determine the corresponding listening range of each of the one or more voice assistants.

12. The beacon network of claim 9, wherein the beacon network is a part of a larger beacon network comprising a plurality of beacon networks, each of the plurality of beacon networks including at least one respective primary beacon device and one or more respective secondary beacon devices; and wherein the at least one respective primary beacon device in each of the plurality of beacon networks is communicatively coupled to one or more computing servers associated with an environment in which the large beacon network is deployed.

* * * * *